(12) United States Patent
Ito

(10) Patent No.: US 7,342,671 B2
(45) Date of Patent: Mar. 11, 2008

(54) SENSOR HEAD OF REFLECTIVE OPTICAL ENCODER

(75) Inventor: Takeshi Ito, Hino (JP)

(73) Assignee: Olympus Corporation, Tokyo (JP)

( * ) Notice: Subject to any disclaimer, the term of this patent is extended or adjusted under 35 U.S.C. 154(b) by 495 days.

(21) Appl. No.: 10/966,939

(22) Filed: Oct. 15, 2004

(65) Prior Publication Data

US 2005/0087682 A1    Apr. 28, 2005

(30) Foreign Application Priority Data

Oct. 27, 2003    (JP)    ............... 2003-366307

(51) Int. Cl.
*G01B 11/14* (2006.01)
(52) U.S. Cl. ................................. 356/616
(58) Field of Classification Search ........ 356/616–617; 33/707; 250/237 G, 239
See application file for complete search history.

(56) References Cited

U.S. PATENT DOCUMENTS

| | | | | |
|---|---|---|---|---|
| 4,703,176 A * | 10/1987 | Hahn et al. | ............ | 250/231.14 |
| 5,995,229 A | 11/1999 | Omi | | |
| 7,064,842 B1 * | 6/2006 | Yamamoto et al. | ......... | 356/499 |
| 2002/0104960 A1 * | 8/2002 | Omi | ....... | 250/231.13 |
| 2004/0119989 A1 * | 6/2004 | Mayer et al. | ............... | 356/616 |
| 2006/0007451 A1 * | 1/2006 | Ito | ............... | 356/616 |

FOREIGN PATENT DOCUMENTS

| | | |
|---|---|---|
| EP | 1 014 043 A1 | 6/2000 |
| JP | 10-132558 | 5/1998 |
| JP | 11-101660 | 4/1999 |
| JP | 2002-531818 | 9/2002 |
| JP | 2003-83771 | 3/2003 |
| JP | 2003-149005 | 5/2003 |

* cited by examiner

*Primary Examiner*—Tarifur Chowdhury
*Assistant Examiner*—Jonathon D Cook
(74) *Attorney, Agent, or Firm*—Scully, Scott, Murphy & Presser, P.C.

(57) ABSTRACT

A sensor head is used with a scale having a periodic optical pattern to constitute a reflective optical encoder. The sensor head includes a light source which emits a light beam applied to the scale, a photodetector which detects a light beam reflected and modulated by the scale, and a package which contains the light source and the photodetector. The package includes a box-like housing with a flat outer bottom surface and a lid member having a light-transmitting portion in at least part of it. The light source is fixed to an inner surface of the housing. The photodetector is fixed to an inner surface of the lid member.

24 Claims, 7 Drawing Sheets

SENSOR HEAD OF REFLECTIVE OPTICAL ENCODER

CROSS-REFERENCE TO RELATED APPLICATIONS

This application is based upon and claims the benefit of priority from prior Japanese Patent Application No. 2003-366307, filed Oct. 27, 2003, the entire contents of which are incorporated herein by reference.

BACKGROUND OF THE INVENTION

1. Field of the Invention

The present invention relates to a sensor head which is used with a scale having a periodic optical pattern to constitute a reflective optical encoder.

2. Description of the Related Art

Currently, so-called encoders such as optical and magnetic encoders have been used to detect displacement amounts in a linear direction for machine tool stages, three-dimensional measurement instruments, and the like, and to detect rotational angles for servo motors and the like.

An optical encoder generally comprises a scale fixed to a displacement detection target such as a stage and a sensor head for detecting the displacement of the scale. The sensor head includes a light-emitting unit which applies light to the scale and a photodetection unit which detects a light beam modulated by the scale. The sensor head detects the movement of the scale in accordance with a change in the intensity of a received light beam.

An optical encoder has characteristics such as high precision, high resolution, noncontact, and high electromagnetic interference resistance, and hence is used in various fields. For applications demanding high precision and high resolution, in particular, the use of optical encoders goes mainstream.

A conventional representative optical encoder will be described with reference to FIG. 17. FIG. 17 shows a prior art of an optical encoder using an LED as a light source and a reflective scale. Such an optical encoder using an LED and reflective scale is disclosed in, for example, U.S. Pat. No. 5,995,229.

As shown in FIG. 17, this optical encoder comprises a reflective scale 502 and a sensor head 501 including an LED 520 and photodetector 533. The scale 502 has a periodic optical pattern on its surface. The optical pattern is formed by patterning a thin metal film made of chromium or the like on the surface of a transparent member such as a glass member. The sensor head 501 includes a transparent element substrate 530. A light source slit 534 is formed in the element substrate 530. The photodetector 533 is fixed on the transparent element substrate 530 and electrically connected to an interconnection 540 through an interconnection 512 formed on the surface of a resin-molded block 510. The LED 520 is fixed in an element embedding hole formed in the resin-molded block 510. An electrode 521 extending from the LED 520 is connected to the interconnection 540 through the interconnection 512 formed on the surface of the resin-molded block 510.

The scale 502 is fixed to a displacement detection target such as a stage (not shown), and moves relative to the sensor head 501 together with the displacement detection target. The sensor head 501 detects the movement amount or moving direction of the scale 502 on the basis of a change in the intensity of a light beam modulated by the scale 502. An output signal from the sensor head 501 is output as a waveform like that shown in FIG. 16. In this case, an A-phase signal and B-phase signal are a pair of waveforms output upon movement of the scale 502, and are generally quasi sinusoidal waves. The A-phase signal and B-phase signal are 90° out of phase with each other. The moving direction of the scale 502 can be detected from the phase relationship between the A-phase signal and the B-phase signal.

The operation of this optical encoder will be described next.

The LED 520 is connected to a power supply through the electrode 521, interconnection 512, and interconnection 540, and emits a light beam in accordance with the current supplied from the power supply. The light beam passes through the light source slit 534 and element substrate 530 and strikes the scale 502. The light beam reflected by the scale 502 is detected by the photodetector 533. At this time, when the pitch of the light source slit 534, the light beam wavelength of the LED 520, the pitch of the periodic pattern formed on the scale 502, the spacing between the sensor head 501 and the scale 502, and the like have a predetermined relationship, a bright-and-dark pattern similar to the periodic optical pattern formed on the scale 502 is projected on the photodetector 533. Therefore, the photodetector 533 detects the periodic bright-and-dark pattern and generates an A-phase signal and B-phase signal as a pair of signals having a phase difference of 90°.

A pitch $p_2$ of the bright-and-dark pattern is calculated by $$p_2 = p_1 \times (z_1 + z_2)/z_1 \qquad (1)$$

where $p_1$ is the pitch of the optical pattern formed on the scale 502, $z_1$ is the spacing between the light source slit 534 and the scale 502, and $z_2$ is the spacing between the scale 502 and the light-receiving surface of the photodetector 533.

If $z_1$ and $z_2$ are equal to each other in equation (1), $$p_2 = 2 \times p_1 \qquad (2)$$

That is, if the distance between the scale 502 and the light source slit 534 is made equal to the distance between the scale 502 and the photodetector 533, the pitch $p_2$ of the bright-and-dark pattern does not change even with a change in the spacing between the scale 502 and the sensor head 501. This makes it possible to perform detection more stably. In other words, in order to perform stable detection, the level of the light source slit 534 relative to the scale 502 is preferably equal to that of the photodetector 533. Since the bright-and-dark pattern moves on the photodetector 533 upon movement of the scale 502, the movement of the scale 502 can be detected by detecting the movement of the bright-and-dark pattern.

In general, when the sensor head 501 is to be mounted, since the positional relationship between the scale 502 and the sensor head 501 must be precisely adjusted, the bottom surface (the upper surface in FIG. 17) of the sensor head 501 is often used as an abutting surface. According to the sensor head described above, however, since the electrode 521 of the LED 520 is formed on the bottom surface of the resin-molded block 510, the electrode 521 protrudes from the bottom surface of the resin-molded block 510. This tends to cause a shift in level or a tilt when the sensor head is mounted.

BRIEF SUMMARY OF THE INVENTION

The present invention is directed to a sensor head which is combined with a scale having a periodic optical pattern to constitute a reflective optical encoder. The sensor head according to the present invention includes a light source which emits a light beam applied to the scale, a photodetector which detects a light beam reflected and modulated by the scale, and a package which contains the light source and the photodetector. The package includes a box-like housing with a flat outer bottom surface and a lid member having a light-transmitting portion in at least part of it. The light source is fixed to an inner surface of the housing. The photodetector is fixed to an inner surface of the lid member.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the views of the accompanying drawing.

First Embodiment

Figure 1:
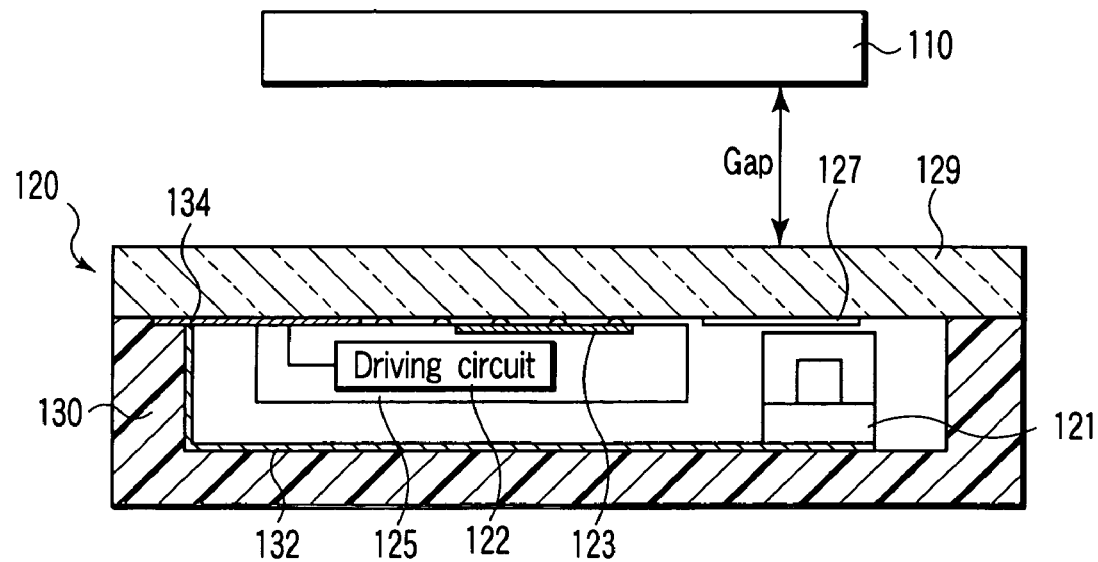
FIG. 1 is a view showing a reflective optical encoder according to the first embodiment of the present invention.
Figure 2:
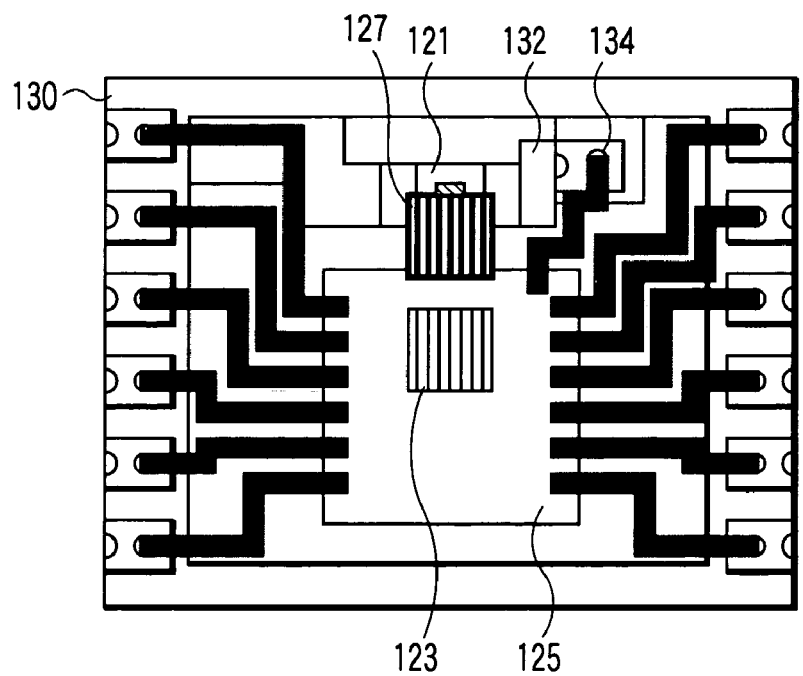
FIG. 2 is a plan view of a sensor head in FIG. 1.
Figure 3:
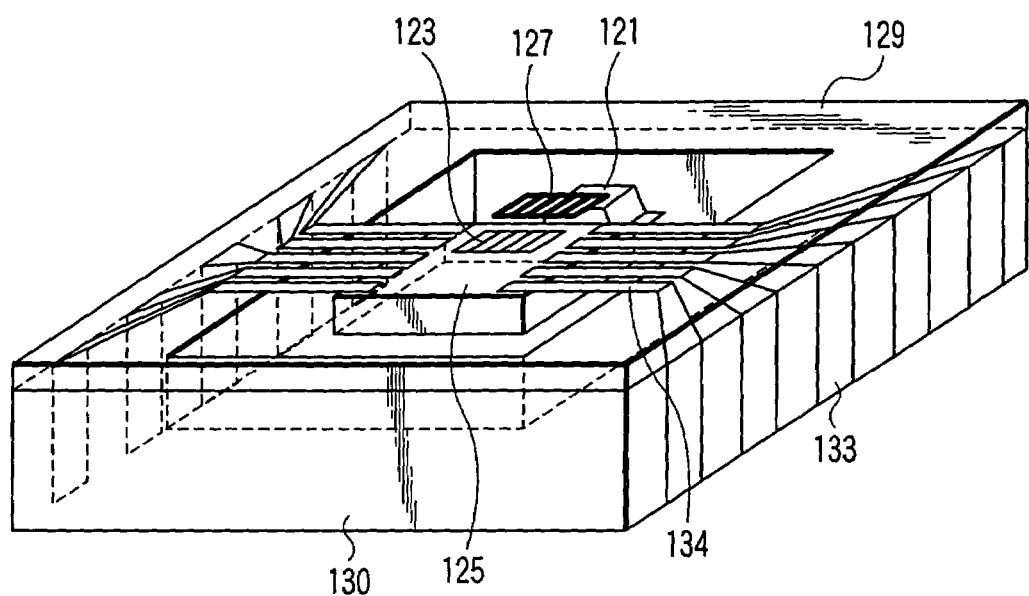
FIG. 3 is a perspective view of the sensor head shown in FIG. 1.

This embodiment is directed to a reflective optical encoder including a sensor head according to the present invention. FIG. 1 shows a reflective optical encoder according to the first embodiment of the present invention. FIG. 2 is a plan view of the sensor head shown in FIG. 1. FIG. 3 is a perspective view of the sensor head in FIG. 1.

As shown in FIG. 1, the reflective optical encoder of this embodiment comprises a reflective scale 110 fixed to a movement detection target and a sensor head 120 for detecting the movement of the scale 110.

The reflective scale 110 has a periodic optical pattern on its surface. The reflective scale 110 is formed by patterning a thin metal film made of chromium or the like on the surface of a transparent member such as a glass member.

The sensor head 120 includes a light source 121 which emits a light beam applied to the scale 110, a photodetector 123 which detects a light beam reflected and modulated by the scale 110, and a package containing the light source 121 and photodetector 123.

The package comprises a box-like housing 130 having a flat outer bottom surface and a lid member 129 having at least a portion which transmits light. The light source 121 is fixed in the inner space of the housing 130. The photodetector 123 is formed on a semiconductor substrate 125. The semiconductor substrate 125 is fixed to the inner surface of the lid member 129. In addition to the photodetector 123, a light source driving circuit 122 for driving the light source 121 and a signal processing circuit which processes a signal from the photodetector 123 are provided on the semiconductor substrate 125.

The lid member 129 is made of, for example, a glass plate, although not limited to this. The housing 130 is preferably formed from a light-shielding member.

The lid member 129 has an interconnection pattern 134 including interconnections on its inner surface, as shown in FIGS. 2 and 3. The interconnection pattern 134 is electrically connected to electrodes of the semiconductor substrate 125. That is, the interconnection pattern 134 is electrically connected to the photodetector 123, light source driving circuit 122, signal processing circuit, and the like in the semiconductor substrate 125.

The photodetector 123 is placed on the same surface of the semiconductor substrate 125 on which the electrodes are formed. Therefore, the surface of the lid member 129 on which the interconnection pattern 134 is formed is placed to face the surface of the semiconductor substrate 125 on which the photodetector 123 is formed. The interconnection pattern 134 is formed so as not to block the optical path along which the light beam reflected and modulated by the scale 110 enters the photodetector 123.

As shown in FIG. 1, the housing 130 has an interconnection pattern 132 on its inner surface. The interconnection pattern 132 is electrically connected to the electrode of the light source 121. The interconnection pattern 132 on the housing 130 is electrically connected to interconnections of the interconnection pattern 134 electrically connected to the light source driving circuit 122 in a state where the lid member 129 and housing 130 are assembled. That is, the light source 121 is electrically connected to the light source driving circuit 122 in the semiconductor substrate 125 through the interconnection pattern 132 and specific interconnections of the interconnection pattern 134.

The lid member 129 is provided with a light source slit 127 on the inner surface. The light source slit 127 is located on the optical path extending from the light source 121 to the scale 110 in a state where the lid member 129 and housing 130 are assembled.

As shown in FIG. 3, the housing 130 includes electrode terminals 133 extending to the outer lower surface through an outer side surface of the housing 130. The electrode terminals 133 are electrically connected to interconnections of the interconnection pattern 134 formed on the lid member 129 except for the interconnections connected to the light source 121 in a state where the lid member 129 and housing 130 are assembled. The electrode terminals 133 are electrically connected to the photodetector 123, light source driving circuit 122, signal processing circuit, and the like in the semiconductor substrate 125 through the interconnection pattern 134. The electrode terminals 133 are used to supply power to the photodetector 123, light source driving circuit 122, signal processing circuit, and the like in the semiconductor substrate 125 and to extract output signals from the signal processing circuit in the semiconductor substrate 125.

In the sensor head 120 of this embodiment having the above arrangement, since the outer bottom surface of the housing 130 forming part of the package containing the light source 121 and photodetector 123 is flat, the outer bottom surface of the housing 130 can be used as a reference surface, i.e., an abutting surface, for mounting of the sensor head.

As described above, the electrode terminals 133 extend to the outer bottom surface of the housing 130. However, the electrode terminals 133 are formed thin enough to ensure the flatness of the outer bottom surface serving as a reference surface for mounting of the sensor head.

The interconnections electrically connected to the light source 121 and light source driving circuit 122 (the interconnection pattern 132 and the specific interconnections of the interconnection pattern 134) are not exposed outside the package. There is therefore no possibility that the normal operation of the light source 121 will be hindered when dust, conductors, and the like come into contact with the interconnections, or the light source 121 will be destroyed by static electricity.

Since the connection portion between the lid member 129 and the housing 130 needs to obtain electric connection, a bump or the like is formed oh an electrode of either of the members. In order to obtain sufficient mechanical strength for this portion, high adhesive strength is preferably obtained by using an adhesive or the like. In this case, complete sealing may be provided between the lid member 129 and the housing 130 with an adhesive or the like. Alternatively, an opening may be left in a portion between the lid member 129 and the housing 130. When sealing is provided between the housing 130 and the lid member 129, since the light source 121 and semiconductor substrate 125 are hermetically held, they are free from the influence of a change in external atmosphere. This improves the reliability of the integrated circuit. When an opening is left in the connection portion between the housing 130 and the lid member 129, the temperature and humidity inside are always the same as those outside. Therefore, the pressure in the package will never increase at a high temperature or in a vacuum.

Figure 4:
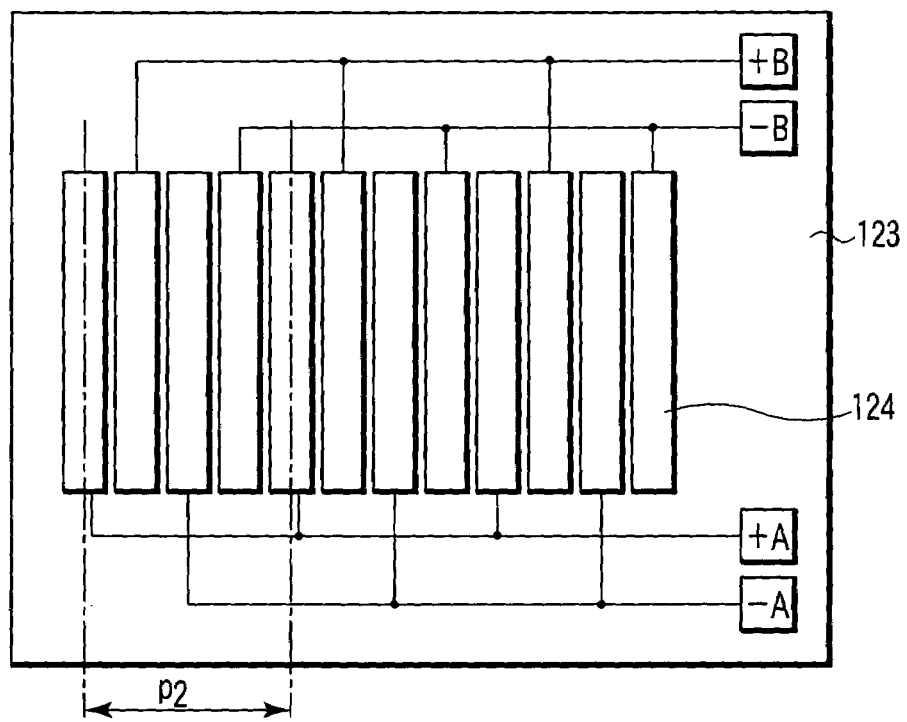
FIG. 4 is an enlarged plan view of a photodetector in FIGS. 1 to 3.
Figure 16:
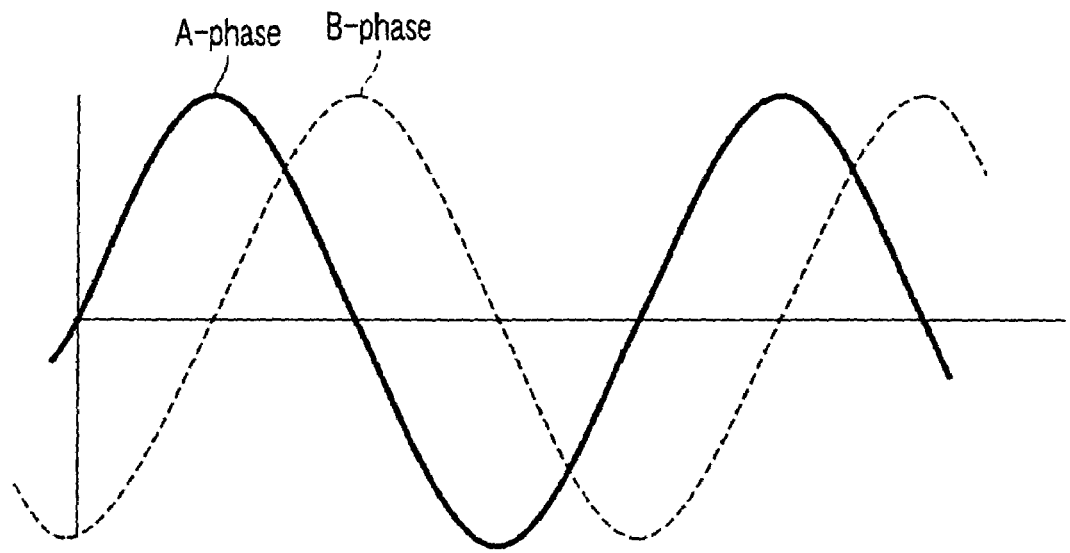
FIG. 16 is a view showing the waveforms of an A-phase signal and B-phase signal which are generally acquired in an optical encoder.
Figure 17:
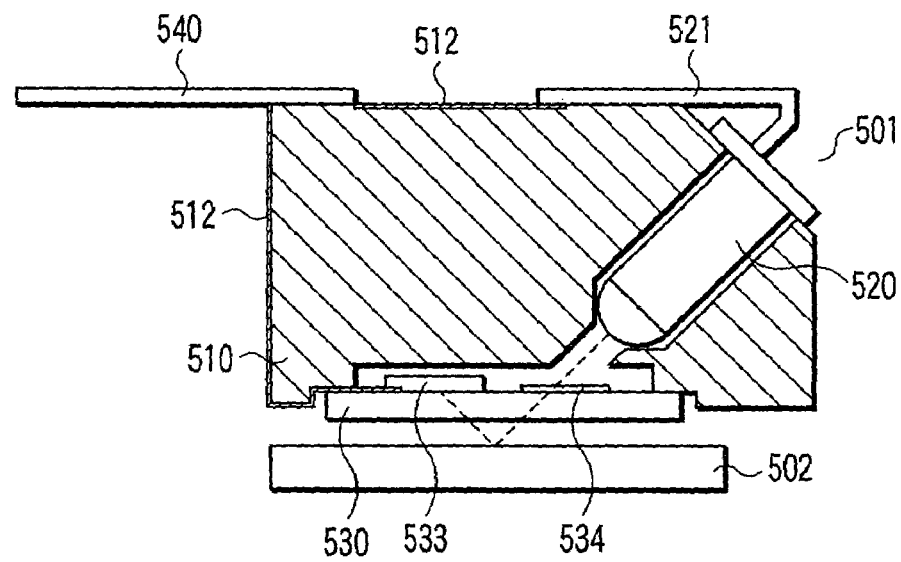
FIG. 17 is a view showing a prior art of an optical encoder using an LED and reflective scale.

The photodetector 123 in this embodiment will be described next. FIG. 4 is an enlarged plan view of the photodetector shown in FIGS. 1 to 3. As shown in FIG. 4, the photodetector 123 includes a light-receiving group (light-receiving region) having one-dimensionally arranged light-receiving portions 124. The respective light-receiving portions 124 are formed into four groups (+A), (+B), (−A), and (−B) which are electrically connected at a period $p_2$ in order to detect four phase portions of a bright-and-dark pattern with the period $p_2$ which are 90° out of phase with each other. The signals detected by these four groups are 90° out of phase with each other. For example, (+A) and (−A) have a relationship of inverted signals which are 180° out of phase with each other. The A-phase signal and B-phase signal in FIG. 16 are computed and output by a signal processing circuit (not shown), as indicated by A-phase signal=(+A)−(−A) and B-phase signal=(+B)−(−B).

In this embodiment, it is assumed to use the photodetector 123 having the respective light-receiving portions 124 of four groups (+A), (+B), (−A), and (−B) arranged one-dimensionally at the period $p_2$. In practice, the photodetector 123 may have any arrangement as long as it can detect predetermined phase portions with the period $p_2$. That is, the light-receiving portions 124 arranged at the period $p_2$ can be partly selected and used. For example, the light-receiving portions are alternately selected, the light-receiving portions 124 to be actually used have a period twice the period $p_2$. Such an arrangement may be used. Furthermore, any arrangement can be used as long as it has a period of an integer multiple of the period $p_2$. Moreover, such light-receiving portions need not be selected with periodicity. Note, however, that the width of each light-receiving portion 124 in the scale moving direction should be equal to or less than the period $p_2$, and preferably a width of ½ or less the period $p_2$.

Figure 5:
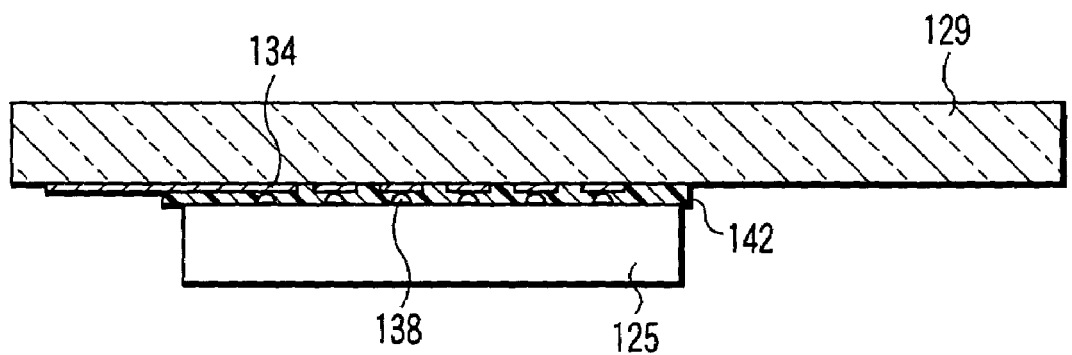
FIG. 5 is an enlarged sectional view of a lid member and semiconductor substrate in FIG. 1.

An example of the method of connecting the lid member 129 to the semiconductor substrate 125 will be described next. FIG. 5 is an enlarged sectional view of the lid member 129 and semiconductor substrate 125.

As shown in FIG. 5, a bump 138 is formed on an electrode portion on the semiconductor substrate 125 by using Au or the like. The semiconductor substrate 125 is connected to the lid member 129 by the so-called flip-chip mounting technique so that the bump 138 is electrically connected to the interconnection pattern 134. At this time, an adhesive member 142 such as an adhesive or anisotropic conductive paste is preferably applied between the semiconductor substrate 125 and the lid member 129 to reinforce the connection. With this arrangement, the adhesive member 142 serves as a reinforcing member to increase the mechanical adhesive strength of the semiconductor substrate 125 with respect to the lid member 129, and the heat generated by the operation of the semiconductor substrate 125 can be dissipated to the lid member 129 side through the adhesive member 142.

The operation principle of the reflective encoder having the above arrangement will be described next.

In this embodiment, since the scale 110 displaces with respect to the sensor head 120 while maintaining a positional relationship which allows the formation of a so-called Talbot image, a bright-and-dark pattern similar to the periodic pattern formed on the scale 110 is projected on the photodetector 123. The bright-and-dark pattern moves on the photodetector 123 upon movement of the scale 110. For this reason, the movement of the scale 110 can be detected by detecting the movement of the bright-and-dark pattern.

The Talbot image will be described. For the sake of simplicity, the following description will be made on the assumption of a transmission encoder. However, the same argument holds for a reflective encoder.

Figure 6:
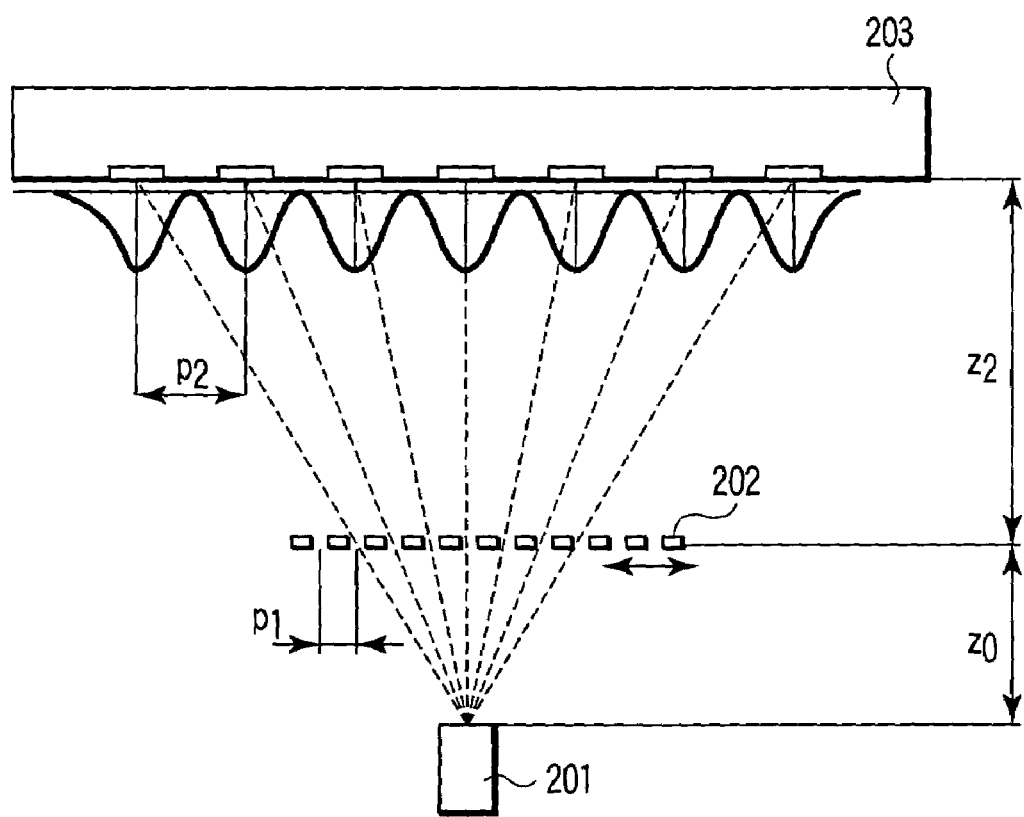
FIG. 6 is a view showing a model of a transmission encoder to explain a Talbot image.

As shown in FIG. 6, each constituent parameter is defined as follows. Let $z_0$ be the distance between a point light source 201 and a surface of a scale 202 on which a diffraction grating is formed, $z_2$ be the distance between the surface of the scale 202 on which the diffraction grating is formed and a photodetector 203, $p_1$ be the pitch of the diffraction grating on the scale 202, and $p_2$ is the pitch of the bright-and-dark pattern projected on the light-receiving surface of the photodetector 203.

According to the diffraction theory of light, a bright-and-dark pattern similar to the diffraction grating on the scale 202, i.e., a so-called Talbot image, is formed on the light-receiving surface of the photodetector 203 when the distances $z_0$ and $z_2$ defined in the above manner satisfy or almost satisfy the relation represented by $$(1/z_0)+(1/z_2)=\lambda/(k(p_1)^2) \qquad (3)$$

where $\lambda$ is the wavelength of the light beam emitted from the point light source 201, and k is an integer.

In this embodiment, the light source slit 127 is placed at the position of the point light source 201 shown in FIG. 6, and the opening portion of each light source slit 127 can be regarded as the point light source 201 in FIG. 6. According to a law that is almost the same of the Talbot image, a bright-and-dark pattern similar to the periodic optical pattern on the scale 202 can be formed on the photodetector 123 by setting the light source slit 127 to an interval Pslit given by $$P_{slit}=p_1\times(z_0+z_2)/z_2 \qquad (4)$$

In this embodiment, since the respective parameters are set to allow formation and detection of a Talbot image, the movement of the scale 110 can be detected by detecting the movement of the Talbot image.

As described above, in the sensor head 120 according to this embodiment, since the outer bottom surface of the housing 130 forming part of the package containing the light source 121 and photodetector 123 is flat, the outer bottom surface of the housing 130 can be used as a reference surface for mounting of the sensor head, i.e., an abutting surface.

In addition, since the interconnections which electrically connect the light source 121 to the light source driving circuit 122 (the interconnection pattern 132 and the specific interconnections of the interconnection pattern 134) are not exposed outside the package, there is no possibility that the normal operation of the light source 121 will be hindered when dust, conductors, and the like come into contact with the interconnections, or the light source 121 will be destroyed by static electricity.

Furthermore, since the light source slit 127 is formed in the surface of the lid member 129 on which the photodetector 123 is placed, and the semiconductor substrate 125 on which the photodetector 123 is formed is fixed to the lid member 129 through the bump 138, the photodetector 123 and light source slit 127 are substantially arranged on a plane with respect to the scale 110. Even with a change in the gap between the sensor head 120 and the scale 110, since the pitch $p_2$ of the bright-and-dark pattern projected on the photodetector 123 is always twice the scale pitch, the optical encoder of this embodiment is robust against the influence of gap variations.

Moreover, in this embodiment, since the light source 121 and semiconductor substrate 125 are fixed to different members, the semiconductor substrate 125 is also robust against the influence of heat generated by the light source 121.

In general, the light source 121 generates heat when it emits light, which changes the temperature of the semiconductor substrate 125. This temperature change changes the characteristics of the semiconductor substrate 125. If, therefore, the light source 121 and the semiconductor substrate 125 are placed near each other or fixed to the same member, the semiconductor substrate 125 is influenced by the heat generated by the light source 121 tends to become unstable in operation. This phenomenon becomes especially noticeable as miniaturization progresses.

In this embodiment, since the light source 121 and semiconductor substrate 125 are fixed to different members, i.e., the lid member 129 and housing 130, respectively, the semiconductor substrate 125 is relatively robust against the influence of the heat generated by the light source 121. When the bottom surface of the housing 130 is fixed, as a reference surface for mounting, i.e., an abutting surface, to a fixed base (not shown), the heat generated by the light source 121 is dissipated to the fixed base through the housing 130 and hence is not easily transferred to the semiconductor substrate 125. That is, this structure is especially suitable for miniaturization.

Second Embodiment

Figure 7:
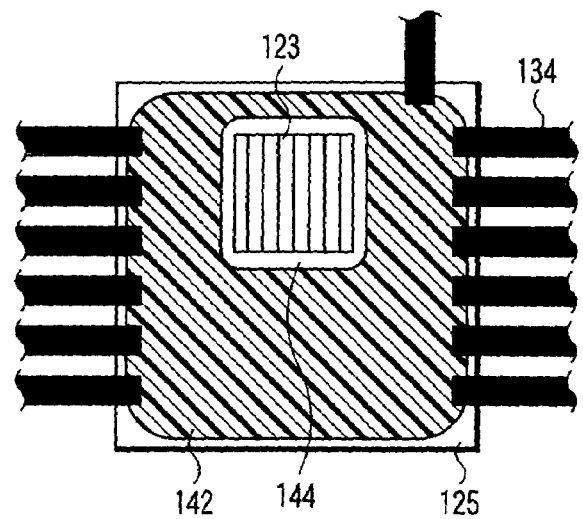
FIG. 7 is a plan view of a peripheral portion of a semiconductor substrate of a sensor head according to the second embodiment of the present invention.

This embodiment is directed to an improvement in the sensor head of the first embodiment. The arrangement of each member of the sensor head of the second embodiment is the same as that in the first embodiment, and the basic operation of the sensor head is the same as that in the first embodiment. FIG. 7 is a plan view of a peripheral portion of the semiconductor substrate of the sensor head according to the second embodiment of the present invention. The same reference numerals as in FIG. 2 denote the same members in FIG. 7, and a detailed description of them will be omitted.

As shown in FIG. 7, in this embodiment, unlike in the first embodiment, an adhesive member 142 applied between a semiconductor substrate 125 and a lid member 129 is applied to only part of a region excluding the light-receiving portion group (light-receiving region) of a photodetector 123.

The adhesive member 142 is applied to almost the entire surface of the semiconductor substrate 125, and a space 144 is provided only near the light-receiving portion group (light-receiving region) of the photodetector 123.

It is generally known that the characteristics of the photodetector 123 change upon receiving external force such as stress. When the adhesive member 142 is applied to the surface of the photodetector, stress acts on the photodetector due to stress at the time of hardening or an expansion coefficient difference produced by changes in temperature. In this embodiment, since the adhesive member 142 is applied to the region excluding the photodetector 123, no stress is directly applied to the photodetector 123. This makes it possible to operate the photodetector more stably.

Methods of providing the space 144 will be described next. The first method is to print the adhesive member 142 in a desired form on the surface of the semiconductor substrate 125 by using a mask, squeegee, or the like. Alternatively, the adhesive member 142 may be applied to only a necessary place by using a stamp. In addition, a wall may be formed first to surround the photodetector 123 by using polyimide or the like and the adhesive member 142 may be applied around the wall to prevent the adhesive from flowing onto the photodetector in the subsequent mounting step.

Referring to FIG. 7, the coating range of the adhesive member 142 is limited to the region on the semiconductor substrate 125. However, a range wider than the semiconductor substrate 125 may be coated with the adhesive member 142 as long as it does not adhere onto the photodetector. In contrast to this, only part of the region may be coated with the adhesive member 142. In addition, if photodetectors 123 are mounted on the semiconductor substrate 125, island-like spaces 144 may be independently provided for the portions of the photodetectors 123 or the photodetectors 123 may be arranged in a continuous space 144. The influence of the adhesive member 142 can be reduced, even if the adhesive member 142 is located of the photodetector 123, by selecting the adhesive member 142 in response to the semiconductor substrate 125 considering the stress, the coefficient of thermal expansion, and the like.

In the sensor head of this embodiment, since stress acting on the photodetector 123 is suppressed, a reflective optical encoder which operates more stably can be formed.

Third Embodiment

Figure 8:
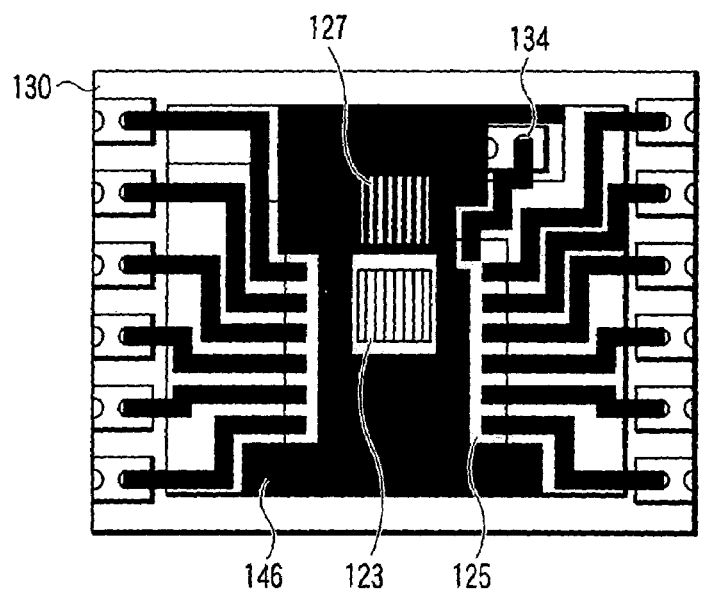
FIG. 8 is a plan view of a peripheral portion of a semiconductor substrate of a sensor head according to the third embodiment of the present invention.

This embodiment is directed to an improvement in the sensor head of the first embodiment. The arrangement of each member of the sensor head of the third embodiment is the same as that in the first embodiment, and the basic operation of the sensor head is the same as that in the first embodiment. FIG. 8 is a plan view of a peripheral portion of the semiconductor substrate of the sensor head according to the third embodiment of the present invention. The same reference numerals as in FIG. 2 denote the same members in FIG. 8, and a detailed description of them will be omitted.

As shown in FIG. 8, in this embodiment, a light-shielding member 146 is formed on at least part of a lid member 129. The light-shielding member 146 is formed on the surface of the lid member 129 on which a light source slit 127 and an interconnection pattern 134 are formed. The light-shielding member 146 is made of the same material for the light source slit 127 and interconnection pattern 134. More specifically, the interconnection pattern 134, light source slit 127, and light-shielding member 146 are simultaneously formed on the lid member 129 by forming a thin conductive film made of chromium, aluminum, or the like on the surface of the lid member 129 and patterning the film by a general photolithographic technique. This reduces the number of manufacturing steps.

The light-shielding member 146 is formed in a region on the lid member 129 which excludes the light source slit 127 and interconnection pattern 134. This region is part of a region which does not block a light beam striking the light-receiving portion group (light-receiving region) of the photodetector 123 in which a light-shielding member can be formed. Although the light-shielding member 146 is preferably formed, as much as possible, on the entire surface of a region, of the transparent region of the lid member 129, in which a light-shielding member can be formed, a similar effect can be obtained even if the light-shielding member 146 is formed on only part of the region.

In the sensor head of this embodiment, since non-signal components, operation errors in circuit portions, noise, and the like which are caused when light beams strike the peripheral portions of the photodetector 123 are reduced, a reflective optical encoder which can perform more stable detection can be formed.

Fourth Embodiment

Figure 9:
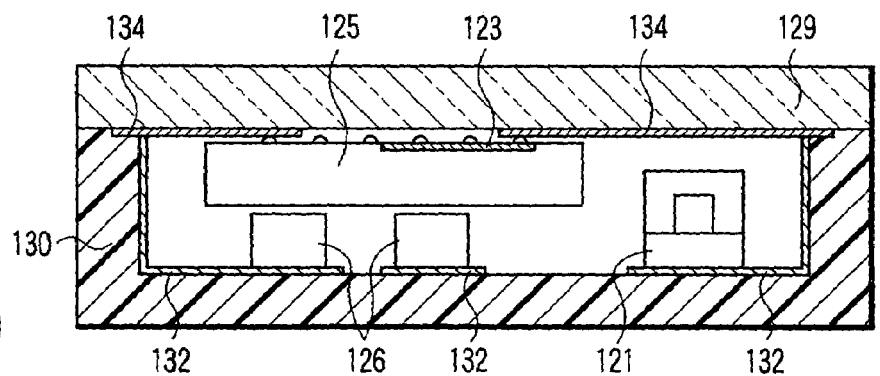
FIG. 9 is a cross-sectional view of a sensor head according to the fourth embodiment of the present invention.

This embodiment is directed to an improvement in the sensor head of the first embodiment. The arrangement of each member of the sensor head of the fourth embodiment is the same as that in the first embodiment, and the basic operation of the sensor head is the same as that in the first embodiment. FIG. 9 is a cross-sectional view of a peripheral portion of the semiconductor substrate of the sensor head according to the fourth embodiment of the present invention. The same reference numerals as in FIG. 1 denote the same members in FIG. 9, and a detailed description of them will be omitted.

As shown in FIG. 9, in this embodiment, electric elements 126 such as capacitors and resistors are arranged in the inner space of a box-like housing 130 at a portion located below a semiconductor substrate 125.

The electric elements 126 are electrically connected to an interconnection pattern 132 and electrically connected to electrodes of the semiconductor substrate 125 through the interconnection pattern 132 formed on the inner surface of the housing and an interconnection pattern 134 formed on a lid member 129.

The electric elements 126 are, for example, a capacitor for oscillation prevention which is connected between the power supply and ground, a resistor for generating a reference potential or current, a coil, and the like, which can be used for various applications. In this case, when the interconnection patterns 132 and 134 which connect the electric elements 126 to the semiconductor substrate 125 are to be connected to the power supply or ground, they are exposed outside through the power supply or ground terminal of the housing 130. If, however, these interconnections need not be exposed outside the housing 130, they are preferably not exposed.

Figure 10:
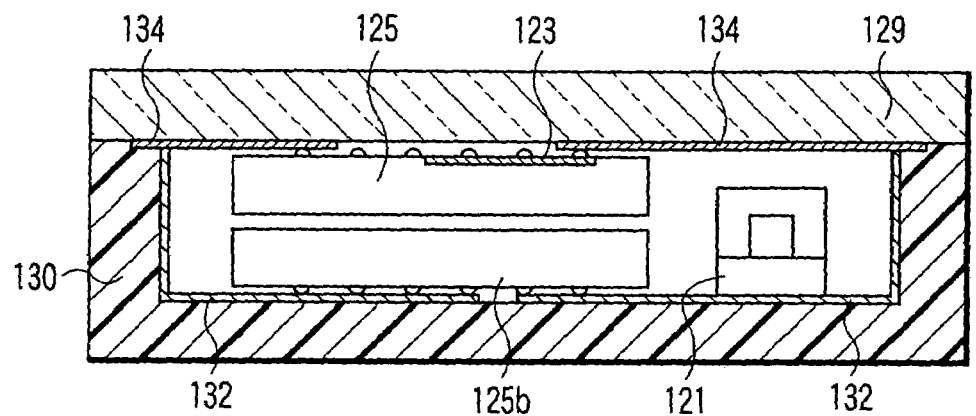
FIG. 10 is a cross-sectional view of a sensor head according to a modification to the fourth embodiment of the present invention.

FIG. 10 is a cross-sectional view of a sensor head as a modification to the fourth embodiment of the present invention. The same reference numerals as in FIG. 9 denote the same members in FIG. 10.

As shown in FIG. 10, in the sensor head of this modification, a semiconductor substrate 125b is placed in the inner space of the housing 130. On the semiconductor substrate 125b, various circuits to be mounted on the sensor head of the encoder, e.g., a signal processing circuit which processes signals from the encoder, a phase division circuit, and an error detection circuit, can be integrated on the semiconductor substrate 125b. If no light source driving circuit is mounted on the semiconductor substrate 125, a light source driving circuit may be mounted on the semiconductor substrate 125b. Referring to FIG. 10, the semiconductor substrate 125b is mounted by the flip-chip mounting technique like that used for the semiconductor substrate 125. However, various mounting techniques including general wire bonding technique can be used.

Referring to FIGS. 9 and 10, it looks as if the interconnection pattern 132 is not connected anywhere and a bump formed on the semiconductor substrate is not connected to any electrode. Such illustration is made for the sake of convenience. In practice, these members are electrically connected to desired electrodes on the semiconductor substrate 125.

According to the sensor heads of this embodiment and its modification, the electric elements 126 used for various purposes and the semiconductor substrate 125b can be mounted by using a space in the package without increasing the size of the sensor head 120. In addition, since interconnections for connecting the electric elements 126 and the semiconductor substrate 125b to the head need not be connected to any part outside the package, the number of electrodes of the package can be minimized.

Fifth Embodiment

Figure 11:
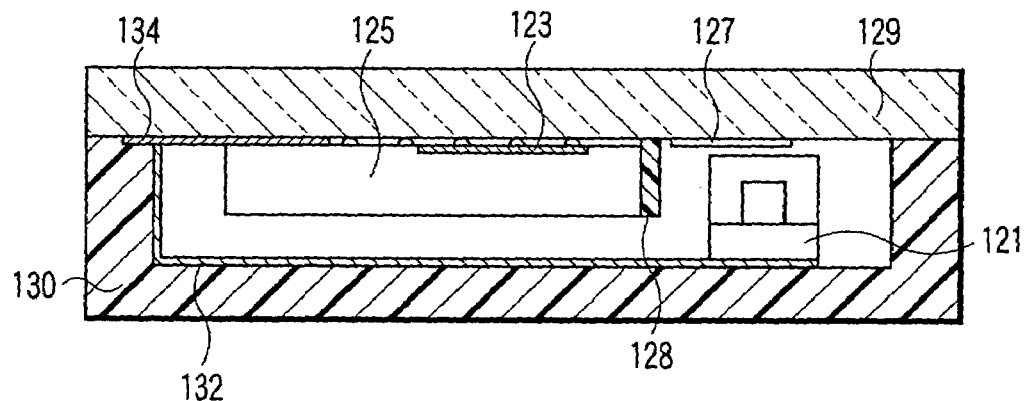
FIG. 11 is a cross-sectional view of a sensor head according to the fifth embodiment of the present invention.

This embodiment is directed to an improvement in the sensor head of the first embodiment. The arrangement of each member of the sensor head of the fifth embodiment is the same as that in the first embodiment, and the basic operation of the sensor head is the same as that in the first embodiment. FIG. 11 is a cross-sectional view of a peripheral portion of the sensor head according to the fifth embodiment of the present invention. The same reference numerals as in FIG. 1 denote the same members in FIG. 11, and a detailed description of them will be omitted.

As shown in FIG. 11, in this embodiment, a light-shielding member 128 is placed at at least part of the region, of a semiconductor substrate 125 on which a photodetector 123 is formed, to which a light beam emitted from a light source 121 is directly applied. More specifically, the light-shielding member 128 is provided on a surface facing the light source 121 of the semiconductor substrate 125.

In general, when a light beam is applied to the semiconductor substrate 125, carriers are generated in the semiconductor substrate 125 even if the applied region is other than the photodetector. The carriers move in the semiconductor substrate 125 and partly flow into the photodetector. For this reason, such carriers may be detected as if they were generated in the photodetector. That is, the carriers generated by the light beam applied to the region other than photodetector are detected by the photodetector, and hence affect the signal components output from the photodetector 123 in the form of noise.

Of light beams applied from the light source 121 to the semiconductor substrate 125, the intensity of a light beam directly applied from the light source 121 to an end portion of the semiconductor substrate 125 is relatively higher than that of a light beam entering the photodetector 123 through a scale 110. Therefore, many carriers are generated by the light beam directly applied to the end portion of the semiconductor substrate 125 and are detected by the photodetector 123. As a consequence, the detection of signal components becomes unstable or large detection errors occur.

In this embodiment, therefore, the light-shielding member 128 is provided on a side surface of the semiconductor substrate 125 to block a light beam emitted from the light source 121 and applied to the side surface of the semiconductor substrate 125. At this time, any member can be used as the light-shielding member 128 as long as it can sufficiently block light beams. That is, the light-shielding member 128 may be a nontransparent resin, metal, or ceramic plate. Alternatively, a coating containing metal strips may be applied to the corresponding portion or a nontransparent adhesive may be applied to the portion and be hardened.

In the sensor head of this embodiment, a light beam emitted from the light source 121 can be properly prevented from being directly applied to the semiconductor substrate 125. This makes it possible to suppress the influence of external light on signal light. Therefore, a reflective optical encoder which outputs more stable signals can be formed.

Figure 12:
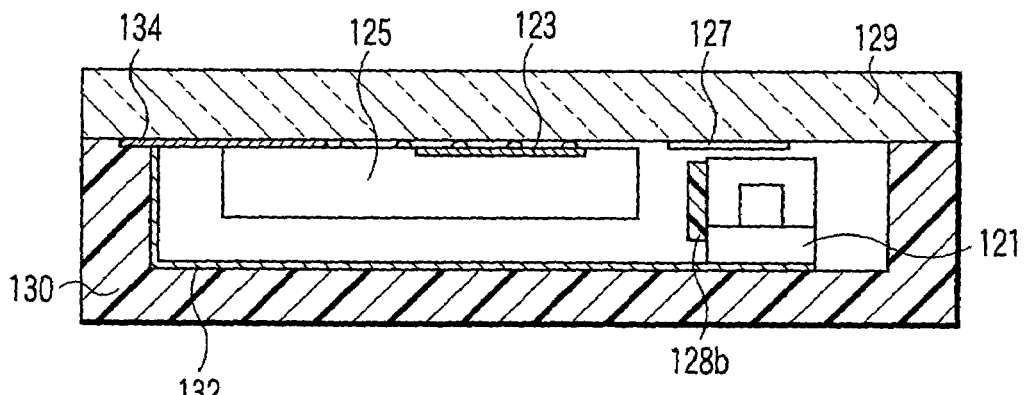
FIG. 12 is a cross-sectional view of a sensor head according to a modification to the fifth embodiment of the present invention.

FIG. 12 is a cross-sectional view of a sensor head as a modification to the fifth embodiment of the present invention. The same reference numerals as in FIG. 12 denote the same members in FIG. 11.

In the sensor head according to this modification, as shown in FIG. 12, a light-shielding member 128b is provided on a surface of the light source 121 which faces the semiconductor substrate 125. In this modification, the same advantages as those of this embodiment can be obtained.

Figure 13:
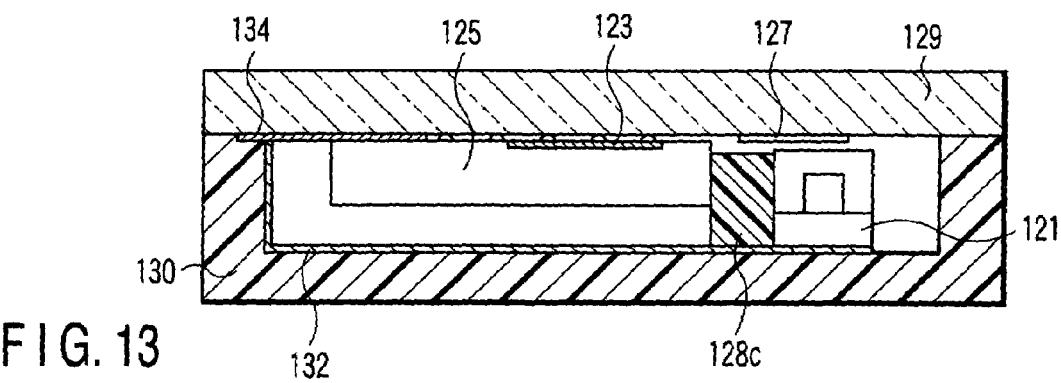
FIG. 13 is a cross-sectional view of a sensor head according to another modification to the fifth embodiment of the present invention.

FIG. 13 is a cross-sectional view of a sensor head as another modification to the fifth embodiment of the present invention. The same reference numerals as in FIG. 13 denote the same members in FIG. 11.

In the sensor head of this modification, as shown in FIG. 13, a light-shielding member 128c is provided in contact with both the light source 121 and the semiconductor substrate 125. In this modification, the same advances as those of this embodiment can be obtained. In this modification, the light-shielding member 128c also serves as a spacer for keeping the spacing between the light source 121 and the semiconductor substrate 125 constant.

Although not shown in particular, a light-shielding member as still another modification may be fixed on the inner surface of a housing 130 so as to be in contact with neither the light source 121 nor the semiconductor substrate 125.

Although the embodiments of the present invention have been described with reference to the views of the accompanying drawing, the present invention is not limited to these embodiments and may be variously modified or changed within the spirit and scope of the invention.

Figure 14:
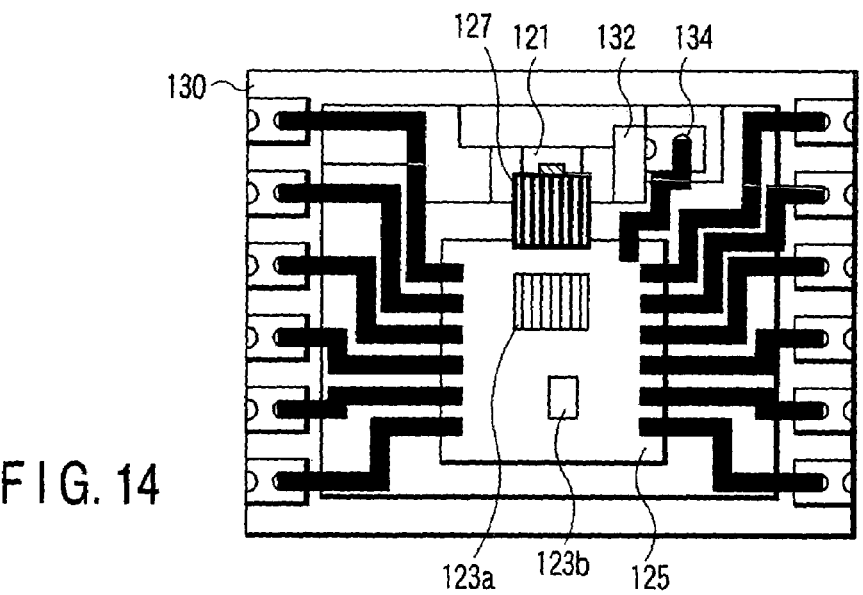
FIG. 14 is a view showing the arrangement of another sensor head to which the present invention can be applied in place of the sensor heads according to the embodiments.
Figure 15:
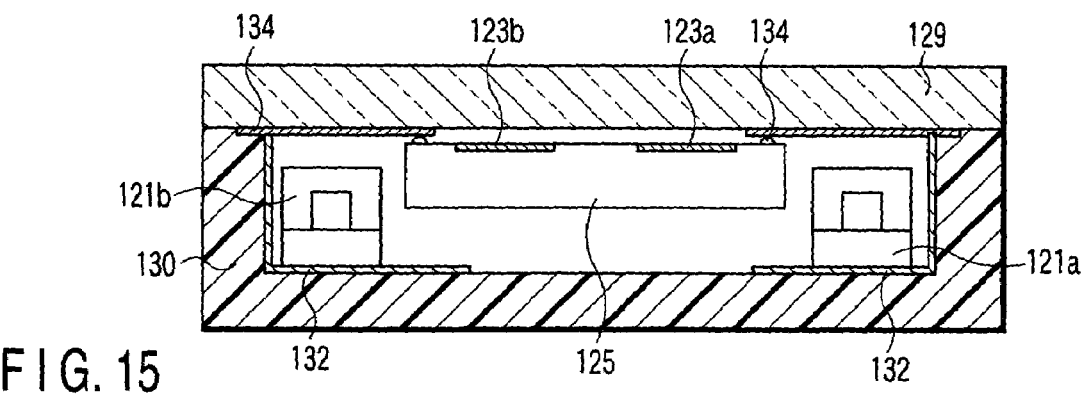
FIG. 15 is a view showing a still another sensor head to which the present invention can be applied, in place of the sensor heads according to the embodiments.

Each embodiment described above has exemplified the sensor head including one light source 121 and one photodetector 123. As shown in FIG. 14, however, the sensor head may include one light source 121 and two photodetectors, e.g., a photodetector 123a for the detection of an A-phase signal and B-phase signal and a photodetector 123b for the detection of a reference position. In addition, as shown in FIG. 15, in addition to the photodetector 123a for the detection of an A-phase signal and B-phase signal and the photodetector 123b for the detection of a reference position, the sensor head may include a light source 121a for the detection of an A-phase signal and B-phase signal and a light source 121b for the detection of a reference position.

A scale including a periodic optical pattern for the detection of an A-phase signal and B-phase signal and the photodetector 123b for the detection of a reference position is combined with the sensor head including the photodetector 123a for the detection of an A-phase signal and B-phase signal and the photodetector 123b for the detection of a reference position. In an optical encoder having this arrangement, a light beam passing through a periodic optical pattern enters the photodetector 123a for the detection of an A-phase signal and B-phase signal, and a light passing through a reference position pattern enters the photodetector 123b for the detection of a reference position.

In the embodiments described above, various types of light sources can be used as the light sources 121. For example, by using an LED as the light source 121, both the requirements of low cost and high performance can be met. In addition, by using an RC-LED (Resonant Cavity LED) or SLD (Super Luminescent Diode) with excellent coherency as the light source 121, an encoder having especially excellent characteristics can be formed. In addition, by using a light source such as a surface emission laser, striped semiconductor laser, current constriction type LED, or the like, an encoder can be formed in accordance with a purpose.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sensor head, which is used with a scale having a periodic optical pattern to constitute a reflective optical encoder, the sensor head comprising:

a light source which emits a light beam applied to the scale;

a photodetector which detects a light beam reflected and modulated by the scale; and a package which contains the light source and the photodetector, the package including a box-like housing with a flat outer bottom surface and a lid member having a light-transmitting portion in at least part of it, the light source being fixed to an inner surface of the housing, and the photodetector being fixed to an inner surface of the lid member, wherein the photodetector is formed on a semiconductor substrate, the semiconductor substrate includes a light source driving circuit which drives the light source, and the light source and the light source driving circuit are electrically connected to each other through electric interconnections formed on the inner surface of the housing and the inner surface of the lid member, so that the electric interconnections connecting the light source to the light source driving circuit are not exposed outside the package.

2. A sensor head according to claim 1, wherein the lid member includes a light source slit on an optical path along which a light beam emitted from the light source travels to the scale.

3. A sensor head according to claim 2, wherein the light source slit is formed in a surface of the lid member on which the electric interconnections are formed.

4. A sensor head according to claim 2, wherein a reinforcing member is provided at at least a portion between the photodetector and the lid member.

5. A sensor head according to claim 4, wherein the reinforcing member comprises an adhesive member provided at at least a portion of a region excluding a light-receiving region of the photodetector.

6. A sensor head according to claim 2, wherein a light-shielding portion is formed at at least part of a region of the lid member excluding a region through which a light beam striking the light-receiving region of the photodetector after passing through the scale passes.

7. A sensor head according to claim 6, wherein the light-shielding portion is formed on a surface of the lid member on which the electric interconnections are formed.

8. A sensor head according to claim 7, wherein the light source slit is also formed in the surface of the lid member on which the electric interconnections are formed.

9. A sensor head according to claim 6, wherein the semiconductor substrate is further provided with a signal processing circuit which processes an output signal from the photodetector, and the light-shielding portion is placed so as to light-shield at least a portion of at least one of the light source driving circuit and the signal processing circuit.

10. A sensor head according to claim 2, wherein at least some of electrodes formed on the photodetector are electrically connected to interconnection electrodes formed on the housing through the interconnections formed on the lid member, and at least some of the interconnection electrodes are electrically connected to electrode terminals provided on a rear surface of the housing through an inside or a side surface of the housing.

11. A sensor head according to claim 2, wherein a light-shielding member is placed at at least part of a region, of the semiconductor substrate on which the photodetector is formed, to which a light beam emitted from the light source is directly applied.

12. A sensor head according to claim 11, wherein the light-shielding member is in contact with the light source.

13. A sensor head according to claim 11, wherein the light-shielding member is in contact with the semiconductor substrate on which the photodetector is formed.

14. A sensor head according to claim 11, wherein the light-shielding member is in contact with both the light source and the semiconductor substrate on which the photodetector is formed.

15. A sensor head according to claim 2, wherein an adhesive layer is provided at at least a portion between the lid member and the housing.

16. A sensor head according to claim 15, wherein an opening is formed in at least a portion between the lid member and the housing.

17. A sensor head according to claim 15, wherein sealing is provided between the lid member and the housing.

18. A sensor head according to claim 2, wherein the light source slit, the photodetector, and the scale are arranged so as to satisfy the following equation: $(1/z_1)+(1/z_2)=\lambda/(k(p_1)^2)$ where $z_1$ is the spacing between the light source slit and the scale, $z_2$ is the spacing between the scale and the photodetector, $\lambda$ is the wavelength of light emitted from the light source, $p_1$ is the pitch of the optical pattern formed on the scale, and k is a natural number.

19. A sensor head according to claim 2, wherein the scale includes a reference position pattern formed on a reference position track in addition to the periodic optical pattern, and the light source slit includes periodic openings formed in at least a portion on an optical path emitting from the light source to the periodic optical pattern, and at least one opening formed in at least a portion on an optical path emitting from the light source to the reference position pattern.

20. A sensor head according to claim 2, wherein an electric element is placed in an inner space of the housing at a portion located below the photodetector.

21. A sensor head according to claim 20, wherein the electric element includes at least one of a resistor, a capacitor, and a coil.

22. A sensor head, which is used with a scale having a periodic optical pattern to constitute a reflective optical encoder, the sensor head comprising:

a light source which emits a light beam applied to the scale;

a photodetector which detects a light beam reflected and modulated by the scale; and a package which contains the light source and the photodetector, the package including a box-like housing with a flat outer bottom surface and a lid member having a light-transmitting portion in at least part of it, the light source being fixed to an inner surface of the housing, and the photodetector being fixed to an inner surface of the lid member, wherein a semiconductor integrated circuit is placed in an inner space of the housing at a portion located below the photodetector, and wherein the semiconductor integrated circuit includes a light source driving circuit which drives the light source, and the light source and the light source driving circuit are electrically connected to each other through electric interconnections formed on the inner surface of the housing, so that the electric interconnections which connect the light source to the light source driving circuit are not exposed outside the package.

23. A sensor head according to claim 22, wherein the semiconductor integrated circuit further includes a signal processing circuit which performs signal processing for an output from the photodetector.

24. A sensor head, which is used with a scale having a periodic optical pattern to constitute a reflective optical encoder, the sensor head comprising:
   a light source which emits a light beam applied to the scale;
   a photodetector which detects a light beam reflected and modulated by the scale; and
   a package which contains the light source and the photodetector, the package including
      a box-like housing with a flat outer bottom surface and a lid member having a light-transmitting portion in at least part of it,
      the light source being fixed to an inner surface of the housing, and
      the photodetector being fixed to an inner surface of the lid member, wherein the housing and lid member are electrically connected to each other, the photodetector is formed on a semiconductor substrate, and the light source and the semiconductor substrate are electrically connected to each other by electric connections which are formed on the inner surface of the housing and the inner surface of the lid member.

* * * * *